(12) United States Patent
Hayamizu et al.

(10) Patent No.: US 12,365,809 B2
(45) Date of Patent: Jul. 22, 2025

(54) AQUEOUS INKJET INK AND PRINTED MATTER

(71) Applicants: artience Co., Ltd., Tokyo (JP); TOYOCOLOR CO., LTD., Tokyo (JP)

(72) Inventors: Mayuko Hayamizu, Tokyo (JP); Yuki Sasaki, Tokyo (JP); Ryosuke Yabuki, Tokyo (JP); Shunsuke Nakamura, Tokyo (JP)

(73) Assignees: Artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 18/879,533

(22) PCT Filed: May 14, 2024

(86) PCT No.: PCT/JP2024/017774
§ 371 (c)(1),
(2) Date: Dec. 27, 2024

(87) PCT Pub. No.: WO2024/247710
PCT Pub. Date: Dec. 5, 2024

(65) Prior Publication Data
US 2025/0163287 A1    May 22, 2025

(30) Foreign Application Priority Data
May 31, 2023    (JP) ................... 2023-089968

(51) Int. Cl.
*C09D 11/38*    (2014.01)
*C09D 11/322*    (2014.01)
*C09D 11/324*    (2014.01)

(52) U.S. Cl.
CPC ............ *C09D 11/38* (2013.01); *C09D 11/322* (2013.01); *C09D 11/324* (2013.01)

(58) Field of Classification Search
CPC ....... C09D 11/38; C09D 11/322; C09D 11/40; C09D 11/30; B41M 5/0047
See application file for complete search history.

(56) References Cited

U.S. PATENT DOCUMENTS

| | | | | |
|---|---|---|---|---|
| 5,183,502 A | * | 2/1993 | Meichsner | C09D 11/30 346/100 |
| 5,395,434 A | * | 3/1995 | Tochihara | C09D 11/38 347/100 |
| 6,051,057 A | | 4/2000 | Yatake et al. | |
| 6,802,893 B1 | * | 10/2004 | Komatsu | C09D 11/40 106/31.89 |
| 7,696,262 B2 | * | 4/2010 | Cagle | C09D 11/38 523/160 |
| 11,951,751 B2 | * | 4/2024 | Shimura | C09D 11/40 |
| 2018/0127610 A1 | | 5/2018 | Kido et al. | |
| 2024/0191093 A1 | | 6/2024 | Kaji et al. | |

FOREIGN PATENT DOCUMENTS

| | | |
|---|---|---|
| JP | 04-183759 A | 6/1992 |
| JP | 11-080639 A | 3/1999 |
| JP | 2002-285055 A | 10/2002 |
| JP | 2003-313480 A | 11/2003 |
| JP | 2005-105227 A | 4/2005 |
| JP | 2013-203909 A | 10/2013 |
| JP | 2020-125382 A | 8/2020 |
| JP | 2021-102726 A | 7/2021 |
| JP | 6958609 B2 | 10/2021 |
| WO | 2022/224786 A1 | 10/2022 |

OTHER PUBLICATIONS

Japanese Notice of Reasons for Refusal of JP2023-089968 dated Nov. 7, 2023.
International Search Report of PCT/JP2024/017774 dated Jul. 16, 2024 [PCT/ISA/210].
Written Opinion of PCT/JP2024/017774 dated Jul. 16, 2024 [PCT/ISA/237].

* cited by examiner

*Primary Examiner* — John Zimmermann
(74) *Attorney, Agent, or Firm* — Sughrue Mion, PLLC

(57) ABSTRACT

Provided is an aqueous inkjet ink, including: a colorant; a water-soluble organic solvent; a surfactant; and water, wherein the water-soluble organic solvent includes a diol having 2 to 5 carbon atoms, and a hexylene glycol, and the surfactant includes an acetylenediol having an HLB value of 10 or less.

6 Claims, No Drawings

AQUEOUS INKJET INK AND PRINTED MATTER

CROSS REFERENCE TO RELATED APPLICATIONS

This application is a National Stage of International Application No. PCT/JP2024/017774 filed on May 14, 2024, claiming priority based on Japanese Patent Application No. 2023-089968 filed on May 31, 2023.

TECHNICAL FIELD

Embodiments of the present invention relate to an aqueous inkjet ink and printed matter formed using the aqueous inkjet ink

BACKGROUND ART

With increasing needs for small-lot printing and printing cost reduction, digital printing methods that do not require platemaking are rapidly becoming popular.

One example of such a digital printing method is an inkjet printing method. In the inkjet printing method, ink droplets are discharged from fine nozzles and applied to a printing substrate (also referred to as simply "substrate" in the present disclosure) to print an image and/or text on the printing substrate. Note that in the present disclosure, a printing substrate and an image and/or text formed by printing ink on the printing substrate are generally referred to as "printed matter". The "image" includes seamless images, such as a solid image and a checkered image. The inkjet printing method is characterized by easy operation of printing devices and low noise during printing. Thus, printing devices (inkjet printers) employing the inkjet printing method among digital printing methods are in high demand.

Inks (referred to as "inkjet inks" in the present disclosure) used in the inkjet printing method are classified into solvent type, aqueous type, ultraviolet (UV) curable type, and the like, according to compositions. Meanwhile, in recent years, there has been an accelerating movement to restrict the use of raw materials that can be harmful to humans and the environment. Accordingly, there is a growing demand for aqueous-type inkjet inks (in the present disclosure, also referred to as simply "aqueous inkjet ink") instead of solvent-type inkjet inks and UV-curable inkjet inks that use the above-described raw materials.

In recent years, along with improvement in performance of inkjet heads, use of the inkjet printing method has been expanding not only for consumer use but also for industrial printing. In particular, in commercial printing and packaging (label and package) printing markets, replacement of forme-based printing methods, such as offset printing methods and gravure printing methods, with inkjet printing methods has been actively considered.

However, it has been conventionally difficult to obtain printed matter having the same printed image quality as that of a forme-based printing method when printing with aqueous inkjet inks on low-permeation substrates, such as coated paper and art paper, as well as on non-permeable substrates, such as films. Specifically, when printing using the inkjet printing method, a phenomenon called "bleeding (mixed color bleeding)" easily occurs where aqueous inkjet inks of different colors mix together. In addition, in printed matter using one type of aqueous inkjet ink, a phenomenon called "beading (density irregularities)" easily occurs where the shades of color look like beads. Furthermore, in solid printed matter (printed matter with a coverage rate of 100%) produced using one type of aqueous inkjet ink, a phenomenon called "voids" easily occurs when there are portions where the aqueous inkjet ink does not get onto the printing substrate. These phenomena are caused by the fact that water, which is the main solvent of the aqueous inkjet ink, has a specifically high surface tension, and thus wetting properties of the aqueous inkjet ink on the substrate is poor especially at times on the microsecond (µs) order.

Generally, hydrophobic organic solvents and surfactants are often used to improve wetting properties on substrates. However, these hydrophobic materials have poor solubility in water. Thus, when such hydrophobic materials are used, there is an issue of nozzle failures, which is considered to be caused by destabilization at a gas-liquid interface of the aqueous inkjet ink, and generation of bubbles. Here, the above nozzle failures refer to a phenomenon where the aqueous inkjet ink is not discharged from a nozzle. As described above, the aqueous inkjet ink used for printing on a low-permeation substrate and a non-permeable substrate has conventionally been required to simultaneously solve two issues: to improve wetting properties on substrates over times on the us order; and to be able to discharge an ink from an inkjet head without a nozzle failure even after a long printing suspension or during continuous printing (favorable discharge stability regardless of conditions of use). However, no aqueous inkjet ink has been found that can resolve all of these issues simultaneously, and preferably.

Note that in the present disclosure, the discharge stability after a long printing suspension is also referred to as "standby discharge properties". The discharge stability during continuous printing is also referred to as "continuous discharge properties".

For example, Patent Document 1 discloses an ink including three or more organic solvents with different water-octanol partition coefficients, although water is the main solvent, and explains that the ink exhibits favorable wetting properties on non-absorbent media (non-permeable substrates). Patent Document 2 discloses an inkjet ink that includes three or more types of compounds (organic solvents) each having a specific structure, where the ratio of the amounts contained of these compounds is defined, and explains that the use of the inkjet ink makes it possible to achieve both wetting properties and drying properties on ink non-absorbent media (non-permeable substrates).

PRIOR ART DOCUMENTS

Patent Documents

Patent Document 1: JP 2020-125382 A
Patent Document 2: WO 2022/224786

SUMMARY OF INVENTION

Problems Invention Aims to Solve

However, both of the inks described in Patent Documents 1 and 2 are insufficient in terms of wetting properties for times on the us order, and there is an issue that nozzle failures occur due to instability of a gas-liquid interface at a nozzle end face of an inkjet head. Thus, all of the issues described above have not been resolved at a high level.

An object of embodiments of the present invention is to provide an aqueous inkjet ink that can produce printed matter having excellent printed image quality even when printed on a low-permeation substrate and a non-permeable substrate, and that has excellent discharge stability regardless of conditions of use.

Means for Solution of the Problems

As a result of intensive research, the inventors discovered that an aqueous inkjet ink having the following structure was able to resolve all of the issues described above simultaneously and at a high level.

That is, one embodiment of the present invention relates to an aqueous inkjet ink. Another embodiment of the present invention relates to a printed matter formed using the aqueous inkjet ink. More specifically, embodiments of the present invention include the following. However, the present invention is not limited to the following embodiments, and includes various embodiments.

[1]

An aqueous inkjet ink, including: a colorant; a water-soluble organic solvent; a surfactant; and water, wherein
the water-soluble organic solvent includes a diol having 2 to 5 carbon atoms, and a hexylene glycol, and
the surfactant includes an acetylenediol having an HLB value of 10 or less.

[2]

The aqueous inkjet ink according to [1] above, wherein an amount of the hexylene glycol is within a range from 0.1% to 30% by mass relative to the total amount of the aqueous inkjet ink.

[3]

The aqueous inkjet ink according to [1] or [2] above, wherein an amount of the acetylenediol having the HLB value of 10 or less is within a range from 0.1% to 2.0% by mass relative to the total amount of the aqueous inkjet ink.

[4]

A printed matter obtained by printing using the aqueous inkjet ink according to any one of [1] to [3] above.

The disclosure of the present application relates to the subject matter described in Japanese Patent Application 2023-089968 filed on May 31, 2023, the entire contents of which are incorporated herein by reference.

Effects of the Invention

With an aqueous inkjet ink according to one embodiment of the present invention, printed matter having excellent printed image quality can be obtained, and further, excellent discharge stability can be obtained regardless of conditions of use, even when printed on a low-permeation substrate or a non-permeable substrate.

EMBODIMENTS FOR CARRYING OUT THE INVENTION

An aqueous inkjet ink according to an embodiment of the present invention (hereinafter, also referred to as simply "aqueous inkjet ink according to the present embodiment" or "ink") will be described below. Note that the present invention is not limited to the embodiments described below, and includes embodiments that can be modified and implemented to the extent that the essential parts of the present invention are not changed.

As described above, the aqueous inkjet ink according to the present embodiment having the above configuration has excellent wetting properties on substrates at times on the us order, and thus printed matter having excellent printed image quality can be obtained even when printing is performed on a low-permeation substrate or a non-permeable substrate. In addition, the aqueous inkjet ink has excellent discharge stability even after a long printing suspension, or during continuous printing. Although the mechanism is unclear, the inventors have presumed as follows. However, the present invention is not limited by the following presumption.

An acetylenediol is generally known as a surfactant that does not easily form bubbles, and is less likely to generate air bubbles, which may cause nozzle failures. In addition, due to its extremely stable molecular structure and small molecular weight, orientation toward the interface with the substrate is easily achieved even in a short time such as on the us order. Particularly, an acetylenediol having an HLB value of 10 or less has favorable wetting properties on substrates that have a very low interfacial free energy, such as PP (polypropylene) films, and improved printed image quality is expected. Meanwhile, acetylenediols having an HLB value of 10 or less have poor solubility in water. Thus, when an acetylenediol having an HLB value of 10 or less is used, there has conventionally been an issue that a gas-liquid interface is destabilized at a nozzle end face of an inkjet head, and nozzle failures easily occurs.

As a result of intensive research, the inventors discovered that when a diol having 2 to 5 carbon atoms, and a hexylene glycol are used as water-soluble organic solvents, an acetylenediol having an HLB value of 10 or less is not destabilized at the gas-liquid interface, and nozzle failures can be controlled. A hexylene glycol (2-methyl-2,4-pentanediol) has multiple branched alkyl groups, and is considered to have a high affinity with the above acetylenediol in terms of structural similarity. Since a hexylene glycol is a diol, it naturally has a high affinity with the diol having 2 to 5 carbon atoms. Consequently, it is presumed that a hexylene glycol and a diol having 2 to 5 carbon atoms become to have a form to protect an acetylenediol having an HLB value of 10 or less, and control destabilization.

In addition, because these water-soluble organic solvents have a low molecular weight and the above-described high affinity, they are quickly oriented toward the interface with the substrate together with the acetylenediol having an HLB value of 10 or less, and can realize wet spreading on the us order. Consequently, printed matter having printed image quality equivalent to that of forme-based printing can be obtained regardless of printing substrates and printing speeds.

As described above, the aqueous inkjet ink having the configuration of the present embodiment can resolve all of the issues described above at a high level.

Each component making up the aqueous inkjet ink according to an embodiment of the present invention will be described in detail below.

Water-Soluble Organic Solvent

The aqueous inkjet ink of the present embodiment includes a water-soluble organic solvent. As described above, as the water-soluble organic solvent, a diol having 2 to 5 carbon atoms, and a hexylene glycol are included.

Diol Having 2 to 5 Carbon Atoms

Examples of diols having 2 to 5 carbon atoms include: alkanediols having 2 to 5 carbon atoms, such as 1,2-ethanediol (ethylene glycol), 1,2-propanediol (propylene glycol), 1,3-propanediol, 1,2-butanediol, 1,3-butanediol, 1,4-butanediol, 2,3-butanediol, 1,2-pentanediol, 1,5-pentanediol, 2,2-dimethyl-1,3-propanediol, 2-methyl-1,3-propanediol, and 3-methyl-1,3-butanediol; and polyoxyalkylene diols having 2 to 5 carbon atoms, such as diethylene glycol and hydroxyethoxypropanol. Only one of these compounds may be used alone, or two or more of these compounds may be used in combination.

Thereamong, it is preferable to use an alkanediol having 2 to 5 carbon atoms as the above diol having 2 to 5 carbon atoms in terms that the above-described mechanism works effectively, and the discharge stability is favorable even after, for example, a long period of printing suspension. More preferably, one or more selected from the group consisting of 1,2-ethanediol, 1,2-propanediol, and 1,3-butanediol can be used. It is particularly preferable to use 1,2-propanediol because discharge stability is favorable even during continuous printing.

In terms of excellent discharge stability regardless of conditions of use, the amount of the above diol having 2 to 5 carbon atoms is preferably within a range from 0.5% to 30% by mass, more preferably from 2% to 25% by mass, and particularly preferably from 6% to 22% by mass, relative to the total amount of the aqueous inkjet ink.

Hexylene Glycol

The amount of the hexylene glycol included in the aqueous inkjet ink of the present embodiment is preferably within a range from 0.1% to 30% by mass, more preferably from 0.6% to 24% by mass, and particularly preferably from 1% to 20% by mass, relative to the total amount of the aqueous inkjet ink, in terms that both discharge stability and printed image quality of printed matter become favorable.

The amount of the hexylene glycol is preferably within a range from 3% to 70% by mass, more preferably from 5% to 50% by mass, and particularly preferably from 10% to 30% by mass, relative to the total amount of the water-soluble organic solvent included in the aqueous inkjet ink. When the amount of the hexylene glycol relative to the total amount of the water-soluble organic solvent is within the above ranges, the acetylenediol having an HLB value of 10 or less can be easily stabilized at the gas-liquid interface in combination with the diol having 2 to 5 carbon atoms, and favorable discharge stability can be obtained, for example, even after a long period of printing suspension. The orientation of the above acetylenediol toward the interface with the substrate is optimized, and the wetting properties on the substrate for times on the us order are also improved.

The ratio of the amount of the above diol having 2 to 5 carbon atoms to the above hexylene glycol (amount of the diol having 2 to 5 carbon atoms/amount of the hexylene glycol) included in the aqueous inkjet ink is preferably within a range from 0.1 to 20. The above amount is more preferably within a range from 0.15 to 8, and particularly preferably from 0.2 to 5. By adjusting the ratio of the amount within the above ranges, the acetylenediol having an HLB value of 10 or less can be stabilized at the gas-liquid interface in combination with the diol having 2 to 5 carbon atoms, and favorable discharge stability can be obtained even during continuous printing at high speed, for example. The orientation of the acetylenediol is optimized, and the wetting properties on the substrate for times on the us order are also improved.

In order to realize both discharge stability and printed image quality, it is further preferable to consider drying behavior of the water-soluble organic solvent described above. Specifically, a ratio "(VE2)/(VE1)" of energy (VE2) required to evaporate a hexylene glycol to energy (VE1) required to evaporate a diol having 2 to 5 carbon atoms is preferably within a range from 0.05 to 1.5, more preferably from 0.1 to 1.1, and particularly preferably from 0.2 to 0.9. When the hexylene glycol and the diol having 2 to 5 carbon atoms are used in combination in such a manner that the energy amount ratio falls within the above ranges, both excellent discharge stability, and printed matter having excellent printed image quality can be easily obtained. Although the detailed mechanism is unclear, by adjusting the above energy amount ratio, it is possible to prevent the water-soluble organic solvent from volatilizing before effects such as affinity with an acetylenediol having an HLB value of 10 or less, and wet spreading on the printing substrate can be obtained. Consequently, it becomes possible to easily improve both the discharge stability and the printed image quality of printed matter, regardless of the type of printing substrates, printing conditions, and printing speeds.

Energy required to evaporate a water-soluble organic solvent can be calculated using formula (1-1) below.

$$VE=(BP-25)\times MP \times SH \qquad \text{Formula (1-1):}$$

In the above formula (1-1), VE is the energy (cal) required to evaporate the target water-soluble organic solvent included in the aqueous inkjet ink.

BP is the boiling point (° C.) of the water-soluble organic solvent at one atmosphere.

MP is the amount (% by mass) of the above water-soluble organic solvent in the aqueous inkjet ink.

SH is the specific heat (cal/g·° C.) of the above water-soluble organic solvent at 25° C. The specific heat can be calculated using a Missenard estimation method described below.

In the Missenard estimation method, the sum of values determined in accordance with a molecular structure and temperature of a target compound is taken as a specific heat (cal/mol·° C.) at the temperature. However, since the unit of the specific heat calculated using the Missenard estimation method is "cal/mol·° C.", a value of the specific heat of the target compound obtained using the Missenard estimation method is divided by the molecular weight of the target compound, and used in the above formula (1-1). Note that examples of values at 25° C. determined according to molecular structures, as described above, are shown in Table 1 below.

[Table 1]

TABLE 1

| Molecular structure | Additional value |
|---|---|
| —$CH_3$ | 10.0 |
| —$CH_2$— | 6.8 |
| —CH— | 6.0 |
| >C< | 2.0 |
| —O— | 7.1 |
| —OH | 10.5 |
| —COO— | 14.1 |

Other Water-Soluble Organic Solvents

The aqueous inkjet ink of the present embodiment may include a water-soluble organic solvent other than the above-described diol having 2 to 5 carbon atoms, and the above-described hexylene glycol (referred to as "other water-soluble organic solvents" in the present disclosure).

In the aqueous inkjet ink of the present embodiment, examples of the above-described other water-soluble organic solvents used include:
- alkanediols (excluding those having 2 to 5 carbon atoms, and hexylene glycols),
- alkanetriols (those having 3 to 6 carbon atoms),
- polyoxyalkylene diols (those where the oxyalkylene group is an oxyethylene group and/or an oxypropylene group, the number of oxyalkylene group is 2 to 4, and excluding those having 2 to 5 carbon atoms), (poly)oxyalkylene monoalkyl ethers (those where the oxyalkylene group is an oxyethylene group and/or an oxypropylene group, the number of oxyalkylene groups is 1 to 4, and the number of carbon atoms in the alkyl group at a terminal is 1 to 4, or those where the oxyalkylene group is an oxybutylene group or an oxypentylene group, the number of oxyalkylene groups is 1, and the number of carbon atoms in the alkyl group at a terminal is 1 to 4), (poly)oxyethylene dialkyl ethers (those where the number of oxyalkylene groups is 1 to 4, and the number of carbon atoms in the alkyl group at a terminal is each 1 to 4), lactams (those where the number of atoms making up a lactam ring is 5 to 7. An alkyl group having 1 to 2 carbon atoms, a hydroxyalkyl group having 1 to 2 carbon atoms, or a vinyl group may be bonded to a nitrogen atom and/or a carbon atom making up the lactam ring.), and alkanolamines (those where the number of amino groups is 1, the number of hydroxyl groups is 1 to 3, and the number of carbon atoms is 3 to 9).

Only one of these other water-soluble organic solvents may be used alone, or two or more of these other water-soluble organic solvents may be used in combination.

Note that in the present disclosure, "(poly)oxyalkylene" means oxyalkylene and polyoxyalkylene.

In some embodiments, it is preferable to use a water-soluble organic solvent having a static surface tension of 29 to 50 mN/m at 25° C., as another water-soluble organic solvent included in the aqueous inkjet ink. By using a water-soluble organic solvent having the above surface tension, it is possible to maintain an appropriate surface tension for discharge as inkjet ink. In addition, for example, even after a long period of printing suspension, favorable discharge stability can be easily obtained. Furthermore, from the viewpoint of improving both the printed image quality and the standby discharge properties of printed matter, it is also preferable to use a water-soluble organic solvent having a boiling point of 150° C. to 220° C. at one atmosphere, as another water-soluble organic solvent.

Thus, although not particularly limited, among the other water-soluble organic solvents listed above, it is possible to preferably use (poly)oxyalkylene monoalkyl ethers having a static surface tension of 29 to 50 mN/m at 25° C., and a boiling point of 150 to 220° C. at one atmosphere. Specific examples include diethylene glycol monomethyl ether, diethylene glycol monoethyl ether, diethylene glycol mono-n-propyl ether, diethylene glycol monoisopropyl ether, 1,3-butylene glycol monomethyl ether, and 3-methyl-1,3-butylene glycol monomethyl ether.

In contrast, the total amount of the water-soluble organic solvent included in the aqueous inkjet ink of the present embodiment is preferably within a range from 5% to 50% by mass, more preferably from 9% to 40% by mass, even more preferably from 12% to 35% by mass, and particularly preferably from 15% to 30% by mass, relative to the total amount of the aqueous inkjet ink. By adjusting the total amount of the water-soluble organic solvent within the above ranges, it is possible to maintain an appropriate viscosity for discharge as an inkjet ink. Moreover, even after a long period of printing suspension, for example, favorable discharge stability can be easily obtained. In one embodiment, it is preferable that the total amount of the above water-soluble organic solvent be the sum total of a diol having 2 to 5 carbon atoms and a hexylene glycol. In another embodiment, the total amount of the above water-soluble organic solvent may be the sum total of: a diol having 2 to 5 carbon atoms, and a hexylene glycol; and another water-soluble organic solvent. In this case, the amount of the other water-soluble organic solvent is preferably 60% by mass or less, more preferably 40% by mass or less, and even more preferably 30% by mass or less, relative to the total amount of the water-soluble organic solvent. The amount of the other water-soluble organic solvent may be 0% by mass.

In some embodiments, in the above aqueous inkjet ink, the amount of the water-soluble organic solvent having a boiling point of 250° C. or more at one atmosphere is preferably 5% by mass or less (may be 0% by mass), and most preferably 1% by mass or less (may be 0% by mass), relative to the total amount of the above aqueous inkjet ink. By not including the water-soluble organic solvent having a boiling point of 250° C. or more, or even if including a blend amount thereof within the above ranges, it becomes easy to obtain favorable discharge stability even after a long period of printing suspension, for example. In addition, a water-soluble organic solvent having a high boiling point has a high affinity with an acetylenediol having an HLB value of 10 or less, and thus orientation of the acetylenediol toward the gas-liquid interface may be inhibited. In contrast, if the amount of a water-soluble organic solvent having a boiling point of 250° C. or more is within the above ranges, orientation of the acetylenediol having an HLB value of 10 or less is not inhibited, and printed matter having excellent printed image quality without voids is easily obtained.

In the aqueous inkjet ink of the present embodiment, the amount of a water-soluble organic solvent which is a heterocyclic compound is preferably 3% by mass or less (may be 0% by mass), and most preferably 1% by mass or less (may be 0% by mass), relative to the total amount of the above aqueous inkjet ink. Since the heterocyclic compound exhibits a very high solubility in both hydrophilic and hydrophobic materials, there is a possibility that the acetylenediol having an HLB value of 10 or less is dissolved, and orientation toward the gas-liquid interface is inhibited. Thus, by not including the water-soluble organic solvent, which is a heterocyclic compound, or even if including with a blend amount thereof within the above ranges, orientation of the acetylenediol having an HLB value of 10 or less toward the gas-liquid interface is not inhibited, and printed image quality of printed matter become favorable. Furthermore, since the above-described components are prevented from being dissolved in the heterocyclic compound at a nozzle end face of an inkjet head, and an existence balance of these components can be maintained, improvement of discharge stability can also be achieved.

Surfactant

The aqueous inkjet ink of the present embodiment includes a surfactant. As described above, the surfactant includes an acetylenediol having an HLB value of 10 or less. The aqueous inkjet ink of the present embodiment including the acetylenediol having an HLB value of 10 or less has excellent wetting properties on the us order, and even at a time of high-speed printing, it is possible to obtain printed matter having printed image quality equivalent to that of a forme-based printing method.

Acetylenediol Having HLB Value of 10 or Less

The above acetylenediol having an HLB value of 10 or less may be synthesized using a known synthetic method, or commercially available products may be used. Examples of the commercial products include Surfynol (Registered Trademark) 61, 104E, 104H, 104A, 104BC, 104DPM, 104PA, 104PG-50, 420, 440, 2502, SE, SE-F, and DF-110D, Dynol (Registered Trademark) 604 and 607 (manufactured by Evonik Japan Co., Ltd.), and OLFINE (Registered Trademark) E1004, PD-001, PD-002W, and PD-004 (manufactured by Nisshin Chemical Industry Co., Ltd). Only one of these compounds may be used alone, or two or more of these compounds may be used in combination.

Among acetylenediols having an HLB value of 10 or less, it is preferable to use an acetylenediol having an HLB value of 4 to 10, and it is particularly preferable to use an acetylenediol having an HLB value of 7 to 10. When an acetylenediol having an HLB value of 4 to 10 is used, the acetylenediol itself is given a certain degree of affinity for water, and the affinity with a hexylene glycol and a diol having 2 to 5 carbon atoms can be easily improved. Consequently, it is possible to easily improve each of standby discharge properties, and continuous discharge properties, while maintaining preferable printed image quality of printed matter.

In particular, it is preferable to use Surfynol 440 and/or Surfynol 2502, and particularly preferable to use Surfynol 2502, as the acetylenediol having an HLB value of 10 or less, in terms that the above-described mechanism functions effectively, the discharge stability becomes favorable even after a long period of printing suspension, and furthermore that wetting properties on a substrate having a very small interfacial free energy, such as a PP film, is favorable. Printed matter having excellent printed image quality can be obtained regardless of the substrate. Both Surfynol 440 and Surfynol 2502 are compounds included in the acetylenediol having an HLB value of 7 to 10.

In the present disclosure, "HLB (Hydrophilic-lipophilic balance) value" is one parameter representing the degree of hydrophilicity and hydrophobicity of a material. The smaller the HLB value, the higher the hydrophobicity of the material, and the larger the HLB value, the higher the hydrophilicity of the material. As methods for determining the HLB value, there are known methods for measuring through experiment and calculating from a molecular structure. As a method for calculating from the molecular structure, Griffin's method, Davis's method, Kawakami's method, and the like are known. In the present application, a value calculated using the Griffin's method, expressed using formula (1) below is used as the HLB value.

(HLB value)=20×(total sum of molecular weight of a hydrophilic portion)÷(molecular weight of a material)     Formula (1):

The amount of the acetylenediol having an HLB value of 10 or less included in the aqueous inkjet ink of the present embodiment is preferably within a range from 0.1% to 2.0% by mass, and particularly preferably from 0.2% to 1.0% by mass, relative to the total amount of the aqueous inkjet ink. By adjusting the amount of the acetylenediol having an HLB value of 10 or less within the above ranges, printed image quality is improved, and discharge stability is also favorable even after a long period of printing suspension or during continuous printing at high speed.

Other Surfactant

The aqueous inkjet ink of the present embodiment may include a surfactant other than the acetylenediol having an HLB value of 10 or less (referred to as "other surfactants" in the present disclosure).

In the aqueous inkjet ink of the present embodiment, as the above other surfactant, acetylenediol-based surfactants (excluding the acetylenediol having an HLB value of 10 or less), acetylene monool-based surfactants, siloxane-based surfactants, fluorine-based surfactants, polyoxyalkylene monoalkyl ether-based surfactants (those where the oxyalkylene group is an oxyethylene group and/or an oxypropylene group, and the number of the oxyalkylene group is 5 to 100, and/or the number of carbon atoms in the alkyl group at a terminal is 5 to 22), and the like can be used. Only one of these other surfactants may be used alone, or two or more of these other surfactants may be used in combination.

Thereamong, in one embodiment, it is preferable to use one or more selected from an acetylenediol-based surfactant (excluding the acetylenediol having an HLB value of 10 or less) and a siloxane-based surfactant, and it is particularly preferable to use a siloxane-based surfactant, as the above other surfactant. The above embodiment is preferable in terms that surface tension of the aqueous inkjet ink can be significantly reduced in a very short time, printed image quality of printed matter is improved, and wetting properties on a substrate having relatively high interfacial free energy, such as a PET (polyethylene terephthalate) film, is favorable.

Examples of commercially available siloxane-based surfactants preferably used include: TEGO (Registered Trademark) Wet 270, TEGO Wet 280, TEGO Twin 4000, TEGO Twin 4100, TEGO Glide 410, TEGO Glide 432, TEGO Glide 435, TEGO Glide 440, and TEGO Glide 450 manufactured by Evonik Japan Co., Ltd.; and SILFACE SAG series manufactured by Nisshin Chemical Industry Co., Ltd. Thereamong, TEGO Wet 270, TEGO Wet 280, TEGO Twin 4000, and TEGO Twin 4100 can be particularly preferably used.

The total amount of a surfactant included in the aqueous inkjet ink of the present embodiment is preferably within a range from 0.1% to 5% by mass, more preferably from 0.2% to 4.5% by mass, even more preferably from 0.3% to 4% by mass, and particularly preferably from 0.4% to 1.5% by mass, relative to the total amount of the aqueous inkjet ink.

Water

The aqueous inkjet ink of the present embodiment includes water. The water included in the ink of the present embodiment is preferably ion exchanged water (deionized water) instead of general water including various ions. The amount of water is preferably within a range from 45% to 75% by mass, and particularly preferably from 50% to 70% by mass, relative to the total amount of the aqueous inkjet ink. Since water has a low boiling point, it volatilizes preferentially from a nozzle end face of an inkjet head, and a solid fraction concentration at the gas-liquid interface tends to increase. Consequently, the surfactant (especially, those having poor solubility in water, such as the acetylenediol having an HLB value of 10 or less) becomes uneven, which may lead to deterioration of discharge stability. In contrast, when the amount of water is kept within the above ranges, discharge stability is favorable even after a long period of printing suspension or during continuous printing.

Colorant

The aqueous inkjet ink of the present embodiment includes a colorant. Conventionally known dyes and pigments can be used as the colorant. Thereamong, pigments are preferably used in terms of obtaining printed matter having a high concentration or high concealability, and excellent light resistance, excellent water resistance, and the like, and further in terms of controlling color mixing between ink colors, and improving image quality, by appropriately drying and increasing viscosity after landing on a substrate.

Conventionally known organic and inorganic pigments can be optionally used as the above pigments, for example, pigments represented by the following color index names.

That is, red pigments such as C. I. Pigment Red 52, 5, 7, 9, 12, 17, 22, 23, 31, 48:1, 48:2, 48:3, 48:4, 49:1, 49:2, 57:1, 57:2, 112, 122, 123, 146, 147, 149, 150, 166, 168, 170, 171, 175, 176, 177, 178, 184, 188, 202, 207, 209, 254, 255, 260, 264, 266, 269, and 282;

violet pigments such as C. I. Pigment Violet 19, 23, 29, 32, 36, 37, 42, and 50;

orange pigments such as C. I. Pigment Orange 1, 2, 3, 5, 7, 13, 14, 15, 16, 22, 34, 36, 38, 40, 43, 47, 48, 49, 51, 52, 53, 60, 61, 62, 64, 65, 66, 69, 71, and 73;

blue pigments such as C. I. Pigment Blue 15, 15:3, 15:4, 15:6, 16, 60, 64, and 79;

green pigments such as C. I. Pigment Green 7, 10, 36, and 48;

yellow pigments such as C. I. Pigment Yellow 1, 2, 3, 5, 12, 13, 14, 16, 17, 24, 73, 74, 83, 87, 93, 94, 95, 97, 98, 109, 110, 111, 112, 120, 126, 127, 128, 129, 137, 138, 139, 147, 150, 151, 154, 155, 166, 167, 168, 170, 180, 185, and 213;

black pigments such as C. I. Pigment Black 1, 7, and 11; and white pigments such as C. I. Pigment white 4, 5, 6, and 21.

Only one of these pigments may be used alone, or two or more pigments may be used in combination. A solid solution made from two or more of the pigments listed above can be used as a pigment.

The amount of a pigment included in the aqueous inkjet ink of the present embodiment may be adjusted according to applications of printed matter produced using the aqueous inkjet ink. For example, the amount of the pigment is preferably within a range from 0.5% to 30% by mass relative to the total amount of the aqueous inkjet ink. Further, except in the case of a white aqueous inkjet ink (aqueous white ink), the amount of the above pigment is more preferably within a range from 1% to 15% by mass, and particularly preferably from 1.5% to 10% by mass, in terms that printed matter having a high concentration can be obtained without deteriorating discharge stability of the aqueous inkjet ink. In contrast, in the case of an aqueous white ink, the amount of the above pigment is more preferably within a range from 5% to 25% by mass, and particularly preferably from 10% to 20% by mass, in terms that printed matter having a high concealability can be obtained without deteriorating discharge stability of the aqueous white ink.

Resin

The aqueous inkjet ink of the present embodiment may contain a resin. Using a resin is preferable in that viscosity of the ink can be adjusted to a range suitable for discharge from an inkjet head. Further, using a resin is preferable in terms that when the above aqueous inkjet ink is printed on a low-permeation substrate or a non-permeable substrate, and dried, viscosity increases at a speed on the order of μs, and thus bleeding and beading can be controlled, thereby improving printed image quality.

In the present disclosure, the term "resin" refers to a compound where a main chain is formed by linking one or more monomers through a covalent bond, and a mass average molecular weight is 1,000 or more.

In the present disclosure, as the mass average molecular weight of a compound, a polystyrene equivalent value, which can be measured using a method conforming to JIS K 7252, is used. Examples of specific measurement conditions are illustrated below.

Device used: Tosoh Corporation HLC-8320GPC
Column used: TSKgel (Registered Trademark) Super-MultiporeHZ-M (3 pieces)
Column temperature: 40° C.
Eluent: tetrahydrofuran
Flow rate: 0.6 mL/min
Sample solution concentration: 0.1% by mass
Sample solution injection volume: 10 μL Generally, water-soluble resins and resin microparticles are known as forms of resins used in aqueous inkjet inks. The resin included in the aqueous inkjet ink of the present embodiment may be a water-soluble resin or resin microparticles. A combination of a water-soluble resin and resin microparticles may also be used.

In the present disclosure, a resin having a solubility of 1 g or more in 100 g of water at 25° C. is referred to as a "water-soluble resin", and a resin having a solubility of less than 1 g is referred to as a "water-insoluble resin". Among the above-described water-insoluble resin, a resin dispersed in particles in water and having a median diameter on a volume basis (also referred to as "D50" in the present disclosure) of 10 to 1,000 nm is referred to as "resin microparticles".

In the present disclosure, "D50" is a value measured under an environment of 25° C. using a dynamic light-scattering particle size distribution analyzer, such as "NANOTRAC UPA-EX150" manufactured by Microtrac-BEL Corp.

Examples of resins that can be used in the aqueous inkjet ink of the present embodiment include acrylic resins, styrene resins, (anhydrous) maleic acid-based resins, styrene-(anhydrous) maleic acid resins, olefin-(anhydrous) maleic acid resins, urethane resins, polyester resins, vinyl chloride resins, vinyl chloride-vinyl acetate resins, polyolefin resins, and vinyl alcohol resins. Only one of these resins may be used alone, or two or more of these resins may be used in combination.

Note that in the present disclosure, the term "acrylic resin" refers to a resin using an acrylic acid ester and/or a methacrylic acid ester as a polymerizable monomer (a styrene-based monomer may also be used). The "(anhydrous) maleic acid" represents at least one selected from "maleic acid" or "maleic anhydride".

The resin is used in any applications, for example, a pigment dispersion application, a binder application, a wax application, or a thickening application. The resin may be used for one application or multiple applications.

The preferable amount of the resin included in the aqueous inkjet ink of the present embodiment depends on applications of the resin. Among them, the total amount of the resin included in the above aqueous inkjet ink is preferably within a range from 1% to 25% by mass, more preferably from 2% to 20% by mass, even more preferably from 4% to 19% by mass, and particularly preferably from 5% to 18% by mass, relative to the total amount of the aqueous inkjet ink. By adjusting the total amount of the resin within the above ranges, the aqueous inkjet ink thickens around the gas-liquid interface due to volatilization of water after the aqueous inkjet ink has landed on printing substrates. Consequently, color mixing of aqueous inkjet inks that landed adjacent to each other is controlled, and printed image quality of printed matter becomes favorable.

Pigment Dispersing Resin

As described above, a resin used in pigment dispersing applications (in the present disclosure, also referred to as simply "pigment dispersing resin") can be used for the aqueous inkjet ink of the present embodiment. By selecting and examining the composition and molecular weight of a polymerizable monomer forming the pigment dispersing resin, it becomes possible to easily adjust the coating ability of the pigment dispersing resin with respect to the pigment and the electric charge of the pigment dispersing resin, which makes it possible to provide dispersion stability even for fine pigments. In addition, it is possible to obtain a printed material having excellent discharge stability, color development, and color reproducibility.

The type of the pigment dispersing resin is not particularly limited, and the above-described types of resins can be used. Thereamong, it is preferable to use one or more selected from the group consisting of an acrylic resin, a urethane resin, a polyester resin, and a polyolefin resin, in terms of discharge stability, material selectivity, and ease of synthesis.

The pigment dispersing resin may be synthesized using known methods, or commercially available products may be used. Furthermore, there are no particular limitations on the structure thereof, and resins having various structures such as random structures, block structures, comb-like structures, and star-like structures can be used. In addition, a water-soluble resin or a water-insoluble resin may be selected as a pigment dispersing resin.

When a water-soluble resin is used as a pigment dispersing resin, the acid value thereof is preferably more than 100 mgKOH/g and 450 mgKOH/g or less, more preferably within a range from 120 to 400 mgKOH/g, and particularly preferably from 150 to 350 mgKOH/g. By adjusting the acid value within the above ranges, it is possible to maintain the dispersion stability of the pigment, and stable discharge from the inkjet head can be performed regardless of conditions of use. In addition, the solubility of pigment dispersing resins in water can be ensured, and the interaction among pigment dispersing resins becomes preferable, thereby controlling the viscosity of the pigment dispersion, which is preferable in terms of achieving favorable discharge properties of the inkjet head.

Meanwhile, when a water-insoluble resin is used as a pigment dispersing resin, the acid value thereof is preferably within a range from 0 to 100 mgKOH/g, more preferably from 5 to 90 mgKOH/g, and even more preferably from 10 to 80 mgKOH/g. When the acid value is within the above ranges, printed matter having excellent drying properties and favorable printed image quality can be obtained.

The acid value of the resin can be measured by using a known device. In the present disclosure, the acid values of resins herein are values measured by using a potentiometric titration method in accordance with JIS K 2501. An example of a specific measurement method is a method where the resin is dissolved in a toluene-ethanol mixed solvent, then titration is performed with a potassium hydroxide solution, and the acid value is calculated from the titer obtained up to the endpoint, using an AT-610 manufactured by Kyoto Electronics Manufacturing Co., Ltd.

In the aqueous inkjet ink of the present embodiment of the present invention, from the viewpoint of improving the adsorption capacity with respect to the pigment and ensuring dispersion stability, it is preferable to introduce an aromatic group into the pigment dispersing resin. Note that examples of an aromatic group include, but are not limited to, a phenyl group, a naphthyl group, an anthryl group, a tolyl group, a xylyl group, a mesityl group, and an anisyl group. From thereamong, a phenyl group, a naphthyl group, and a tolyl group are preferable in terms of being able to sufficiently ensure dispersion stability.

From the viewpoint of improving dispersion stability of the pigment and discharge stability, and printed image quality and drying properties of the printed matter, the amount introduced of a monomer containing an aromatic ring is preferably within a range from 5% to 75% by mass, more preferably from 5% to 65% by mass, and even more preferably from 10% to 50% by mass, relative to the total amount of a monomer forming the pigment dispersing resin.

Other Components

The aqueous inkjet ink of the present embodiment may include a pH adjuster and another additive in addition to components described above. Examples of the other additive include a crosslinking agent, a preservative, a UV absorber, and an infrared absorber. One or more conventionally known compounds may be used for each of these components.

Method for Producing Aqueous Inkjet Ink

The aqueous inkjet ink of the present embodiment can be produced using conventionally known methods. For example, when a colorant which is water insoluble (water-insoluble colorant) is used, a water-insoluble colorant dispersion is produced by dispersing the water-insoluble colorant in a medium including at least water (aqueous medium). In contrast, when a colorant which is water soluble (water-soluble colorant) is used, a water-soluble colorant aqueous solution is produced by dissolving the water-soluble colorant in an aqueous medium. Water, a water-soluble organic solvent, a surfactant, and the like are added to the water-insoluble colorant dispersion and/or the water-soluble colorant aqueous solution, and after sufficiently stirring and mixing, coarse particles are removed through filtration, centrifugation, or the like. However, the method for producing the aqueous inkjet ink of the present embodiment is not limited to the above-described method.

Properties of Aqueous Inkjet Ink

The aqueous inkjet ink of the present embodiment preferably has a viscosity of 3 to 15 mPa's at 25° C. In this viscosity range, droplets of the aqueous inkjet ink can be discharged in a stable manner not only from inkjet heads having a discharge frequency of about 4 to 10 KHz, but also from inkjet heads having a high discharge frequency of about 20 to 70 KHz. In particular, when the viscosity of the aqueous inkjet ink of the present embodiment at 25° C. is within a range from 4 to 10 mPa's, the aqueous inkjet ink can be discharged in a stable manner even when an inkjet head having a design resolution of 600 dpi or higher is used. Note that in the present disclosure, as the viscosity, a value measured under an environment of 25° C. using a cone plate type rotational viscometer (E-type viscometer, cone angle 1°34') such as "TVE 25 L-type viscometer" manufactured by Toki Sangyo Co., Ltd. is used.

In terms of obtaining the aqueous inkjet ink having excellent discharge stability and excellent printed image quality of printed matter, static surface tension of the aqueous inkjet ink of the present embodiment at 25° C. is preferably within a range from 18 to 35 mN/m, and particularly preferably from 21 to 32 mN/m. Note that in the present disclosure, as the static surface tension, a value measured under an environment of 25° C. by the Wilhelmy method (plate method), using an "automatic surface tensiometer CBVP-Z" manufactured by Kyowa Interface Science Co., Ltd, for example.

When the aqueous inkjet ink of the present embodiment includes a water-insoluble colorant, the median diameter (D50) of the water-insoluble colorant on a volume basis is preferably within a range from 30 to 450 nm, more preferably from 50 to 400 nm, and particularly preferably from 70 to 350 nm, in terms of achieving a high level of both discharge stability, and density or concealability of printed matter.

Set of Aqueous Inkjet Inks

The aqueous inkjet ink of the present embodiment may be used alone, or can also be used as a set of aqueous inkjet inks where two or more aqueous inkjet inks are combined. Examples of the set of aqueous inkjet inks include: a set (process color ink set) of four-color aqueous inkjet inks including a cyan aqueous inkjet ink (aqueous cyan ink), a magenta aqueous inkjet ink (aqueous magenta ink), a yellow aqueous inkjet ink (aqueous yellow ink), and a black aqueous inkjet ink (aqueous black ink); and a set of five-color aqueous inkjet inks where an aqueous white ink is added to the process color ink set. Note that it is preferable that all aqueous inkjet inks making up the set of aqueous inkjet inks satisfy the requirements of the above-described embodiments of the present invention.

Ink-Pretreatment Liquid Set

The aqueous inkjet ink of the present embodiment, and the set of aqueous inkjet inks described above can also be used in combination with a pretreatment liquid including a coagulant (in the form of ink-pretreatment liquid set). By applying the pretreatment liquid including a coagulant to a printing substrate before printing an aqueous inkjet ink, a layer (ink aggregation layer) for intentionally aggregating a solid component included in the aqueous inkjet ink can be formed. Then, by causing the aqueous inkjet ink to land on the ink aggregation layer, coalescence and color mixing of droplets of the aqueous inkjet inks can be prevented, and printed image quality of printed matter can be remarkably improved.

As the coagulant, for example, a water-soluble inorganic or organic salt including a polyvalent metal ion; and a resin that includes a cationic group where a cationic group equivalent amount is greater than an anionic group equivalent amount can be used.

Inkjet Printing Method

The aqueous inkjet ink of the present embodiment is used in the inkjet printing method described above. A printing method as the inkjet printing method typically includes an ink discharging step, and a drying step of the discharged ink. In the printing method, the aqueous inkjet ink of the present embodiment is discharged onto a printing substrate from an inkjet head having a fine nozzle (discharging step). The aqueous inkjet ink discharged onto the printing substrate is preferably dried using a drying mechanism (drying step).

Discharging Step

In the above discharging step, an example operation method for an inkjet head is a shuttle (scanning) method where an aqueous inkjet ink is discharged and recorded while the inkjet head is scanned back and forth in a direction perpendicular to a transport direction of the printing substrate. Another example operation method is a single pass method where an aqueous inkjet ink is discharged and recorded when the printing substrate is passed through the lower part of an inkjet head fixedly arranged. The inkjet head equipped with the aqueous inkjet ink of the present embodiment may adopt either the shuttle method or the single pass method. From thereamong, the single pass method is preferably selected because landing position of droplets of the aqueous inkjet ink does not easily deviate, and thus printed image quality of printed matter is improved, and further, high-speed printing can be performed, and high productivity as an alternative to forme-based printing can be achieved.

The discharge method from the inkjet head can also be optionally selected from known methods. Examples of such discharge methods include a piezo method using a change in the volume of a piezoelectric element, a thermal method where an aqueous inkjet ink is discharged using bubbles generated through heating by using a heater, and a valve method where a pressurized aqueous inkjet ink is discharged while a lid (valve) of a nozzle is opened and closed using a solenoid.

The amount of droplets of the aqueous inkjet ink discharged from the inkjet head is preferably within a range from 0.5 to 20 picoliters, and particularly preferably from 0.5 to 15 picoliters, in terms of reducing drying load and improving printed image quality. In terms of improving the printed image quality, it is preferable to adjust printing conditions (specifically, driving frequency and the installed number of inkjet heads, and printing speed). In some embodiments, the printing conditions may be adjusted in such a manner that recording resolution of printed matter is preferably 600 dpi or higher, and more preferably 1,200 dpi or higher.

Drying Step

Examples of drying methods employed in a drying mechanism used in the drying step include heat drying, hot air drying, infrared (e.g., infrared rays having a wavelength of 700 to 2,500 nm) drying, microwave drying, and drum drying. Any one or more of these methods can be selected and used in the above drying step. When two or more of the above drying methods are employed, the drying methods may be used separately (for example, consecutively), or may be simultaneously used together. For example, when the heat drying method and the hot air drying method are used together, the aqueous inkjet ink can be dried more quickly than when the methods are each used alone.

In particular, from the viewpoint of preventing explosive boiling of liquid components in the aqueous inkjet ink and obtaining printed matter having excellent printed image quality, when the heat drying method is employed, the drying temperature is preferably set within a range from 35° C. to 100° C. When the hot air drying method is employed, the hot air temperature is preferably set within a range from 50° C. to 250° C. From the same point of view, when the infrared drying method is employed, it is preferable that 50% or more of an integrated value of the total output of irradiated infrared rays is in a wavelength region of 700 to 2,200 nm.

Printed Matter

Printed matter according to an embodiment of the present invention includes a printing substrate, and a printing layer including an image or text formed by printing the aqueous inkjet ink of the present embodiment on the printing substrate. Printing can be preferably performed in accordance with the inkjet printing method. Details of the printing method and printing conditions are as described above.

Printing Substrate

The printing substrate where the aqueous inkjet ink of the present embodiment is printed is not particularly limited. In some embodiments, the printing substrate may be a low-permeation substrate and a non-permeable substrate. Generally, printing on a low-permeation substrate and a non-permeable substrate tends to cause bleeding or beading, which deteriorates the printed image quality. In contrast, by using the aqueous inkjet ink of the present embodiment, printed matter having printed image quality equivalent to that of forme-based printing can be obtained even on a low-permeation substrate and a non-permeable substrate, and even in high-speed printing.

Permeability of a printing substrate can be determined using a water absorption amount measured using a dynamic scanning absorption meter. In the present disclosure, permeability is defined by the water absorption amount of pure water at a contact time of 100 msec measured by the following method. Specifically, a printing substrate having a water absorption amount of less than 1 g/m² is referred to as a "non-permeable substrate". A printing substrate having a water absorption amount of 1 g/m² or more and less than 6 g/m² is referred to as a "low-permeation substrate". A printing substrate having a water absorption amount of 6 g/m² or more is referred to as a "permeable substrate".

The water absorption amount of a printing substrate can be measured, for example, under an environment of 23° C. and 50% RH using a dynamic scanning absorption meter (for example, "KM500win" manufactured by KUMAGAI RIKI KOGYO Co., Ltd.) set under the following conditions, and using a printing substrate that is approximately 15 to 20 cm square, as a sample.

Measurement method: spiral scanning (spiral method)
    Measurement start radius: 20 mm
    Measurement end radius: 60 mm
    Contact time: 10 to 1,000 msec
    Number of sampling points: 19 (measured to result in approximately equal intervals relative to the square root of the contact time)
    Scanning interval: 7 mm
    Speed switching angle of rotation table: 86.3 degrees
    Head box conditions: width 5 mm, slit width 1 mm Examples of low-permeation and non-permeable substrates include: plastic films and sheets, such as polyvinyl chloride sheets, polyethylene terephthalate (PET) films, polypropylene films, polyethylene films, polyethylene sheets, nylon films, nylon sheets, polystyrene films, polystyrene sheets, and polyvinyl alcohol films; coated paper, such as standard coated paper, art paper, and cast paper; metals, such as aluminum, iron, stainless steel, and titanium; and glass.

The surface of the above-listed printing substrates may be smooth or uneven. The above printing substrates may be transparent, semi-transparent, or opaque. The shape of the above printing substrates may be a roll shape or a sheet shape. A laminate of two or more of the above-listed printing substrates, affixed to each other, may be used as a printing substrate. A peelable adhesive layer or the like may be provided on the opposite side to the printing surface, or an adhesive layer or the like may be provided on the printed surface subsequent to printing.

The printing surface of the above-listed printing substrates may be subjected to surface modification, such as corona treatment or plasma treatment. The surface modification is preferable in terms of improving wetting properties of the aqueous inkjet ink of the present embodiment, and easily obtaining printed matter that has excellent printed image quality and excellent drying properties, and has favorable rub fastness and favorable substrate adhesion, as the surface of the printed matter is made uniform.

EXAMPLES

The aqueous inkjet ink of the present embodiment will be described in more detail below with reference to examples and comparative examples. Note that, in the following description, unless specifically stated otherwise, "parts" and "%" represent "parts by mass" and "% by mass", respectively.

Production of Water-Insoluble Colorant (Pigment) Dispersion

An amount of 450 g of carbon black ("PrinteX85" manufactured by Orion Engineered Carbons S.A.), 90 g of an acrylic resin, and 2,460 g of water were put into a mixing container (volume: 10 L) equipped with a stirrer, and the mixture was stirred (premixed) for 1 hour to obtain a reaction mixture. The above acrylic resin was a random polymer of styrene/acrylic acid/behenyl acrylate=45/30/25 (mass ratio) where all acid groups were neutralized with dimethylaminoethanol, and had an acid value of about 230 mgKOH/g and a mass average molecular weight of 20,000.

Next, circulation dispersion of the reaction mixture was started using a DYNO-MILL (capacity 0.6 L) manufactured by SHINMARU ENTERPRISES CORPORATION filled with 1,800 g of 0.5 mm diameter zirconia beads. The D50 of the above reaction mixture was measured every specified time (for example, 1 hour) using the device described above, and the circulation dispersion was terminated when the D50 became 120 nm or less. A black pigment dispersion was produced through such a method.

A cyan pigment dispersion was produced using the same raw material and method as the black pigment dispersion, except that LIONOL BLUE 7358G (C.I. Pigment Blue 15:3) manufactured by TOYOCOLOR CO., LTD., was used as the pigment, and circulation dispersion was performed until the D50 became 180 nm or less.

Production of Set of Aqueous Inkjet Inks

A water-insoluble colorant (pigment) dispersion produced by the above method was used, and each raw material was put into a mixing container equipped with a stirrer to obtain the blending formulation described in each column of Table 2. The mixture was then warmed to 50° C. and mixed for another 1 hour. Next, filtration was performed with a membrane filter having a pore size of 0.8 μm to produce sets of aqueous inkjet inks 1 to 52. Note that each set includes an aqueous black ink (K) and an aqueous cyan ink (C). In the production of these inks, a black pigment dispersion and a cyan pigment dispersion were each used.

In the production of a set of aqueous inkjet inks, each raw material was put into a mixing container while stirring. In each column of Table 2, the listed components were added in order from the top. However, when an aqueous inkjet ink that does not include one or more of these components was produced, the following components were put in according to the order without putting the component concerned. For a component including two or more types of raw materials, the order within the components was random.

TABLE 2

|  |  |  |  |  | Ex. 1 | Ex. 2 | Ex. 3 | Ex. 4 | Ex. 5 | Ex. 6 | Ex. 7 |
|---|---|---|---|---|---|---|---|---|---|---|---|
| Aqueous inkjet ink set No. |  |  |  |  | 1 | 2 | 3 | 4 | 5 | 6 | 7 |
| Blend | Ion exchanged water |  |  |  | 29.4 | 29.4 | 29.4 | 29.4 | 29.4 | 29.4 | 29.65 |
| amount | Water- | Diol | EG | bp 198° C. | 15 |  |  |  |  |  |  |
|  | soluble | having 2 | 1,2-PD | bp 188° C. |  | 15 |  |  |  | 15 | 15 |
|  | organic | to 5 | 1,2-BD | bp 191° C. |  |  | 15 |  |  |  |  |
|  | solvent | carbon | 1,3-BD | bp 207° C. |  |  |  | 15 |  |  |  |
|  |  |  | 1,5-PeD | bp 239° C. |  |  |  |  | 15 |  |  |

TABLE 2-continued

|  |  |  |  |  |  |  |  |  |  |  |
|---|---|---|---|---|---|---|---|---|---|---|
|  |  | Hexylene glycol |  | bp 196° C. | 5 | 5 | 5 | 5 | 5 | 5 | 5 |
|  | Others | 3-methyl-1,3-butylene glycol monomethyl ether | bp 173° C. |  |  |  |  |  |  |  |
|  |  | Diethylene glycol monoethyl ether | bp 202° C. |  |  |  |  |  |  |  |
|  |  | Diethylene glycol methyl ethyl ether | bp 179° C. |  |  |  |  |  |  |  |
|  |  | Glycerin | bp 290° C. |  |  |  |  |  |  |  |
|  |  | 2-pyrrolidone | bp 245° C. |  |  |  |  |  |  |  |
| Surfactant | Acetylene diol-based | Surfynol 485 | HLB: 17 |  |  |  |  |  |  |  |
|  |  | Surfynol 465 | HLB: 13 |  |  |  |  |  |  |  |
|  |  | Olfin E1006 | HLB: 11 |  |  |  |  |  |  |  |
|  |  | Olfin E1004 | HLB: 9 |  |  |  |  |  |  |  |
|  |  | Surfynol 2502 | HLB: 8 | 0.5 | 0.5 | 0.5 | 0.5 | 0.5 |  | 0.25 |
|  |  | Surfynol 440 | HLB: 8 |  |  |  |  |  | 0.5 |  |
|  |  | Surfynol420 | HLB: 4 |  |  |  |  |  |  |  |
|  |  | Surfynol 104 | HLB: 3 |  |  |  |  |  |  |  |
|  | Siloxane-based | TEGO Wet 280 |  |  |  |  |  |  |  |  |
|  |  | TEGO Twin 4100 |  |  |  |  |  |  |  |  |
| Resin |  | Resin A | Nv30% | 30 | 30 | 30 | 30 | 30 | 30 | 30 |
|  |  | Resin B | Nv40.5% |  |  |  |  |  |  |  |
| Pigment dispersion |  | Back pigment dispersion or cyan pigment dispersion |  | 20 | 20 | 20 | 20 | 20 | 20 | 20 |
| Other components (preservative) |  | ProxelGXL |  | 0.1 | 0.1 | 0.1 | 0.1 | 0.1 | 0.1 | 0.1 |
| Specs | Total amount |  |  | 100 | 100 | 100 | 100 | 100 | 100 | 100 |
|  | Amount of hexylene glycol relative to total amount of water-soluble organic solvent |  |  | 24.9% | 24.9% | 24.9% | 24.9% | 24.9% | 24.9% | 24.9% |
|  | Ratio of amount of diol having 2 to 5 carbon atoms/amount of hexylene glycol |  |  | 3.0 | 3.0 | 3.0 | 3.0 | 3.0 | 3.0 | 3.0 |
|  | Ratio(E2/E1) of hexylene glycol E2 to diol having 2 to 5 carbon atoms E1 |  |  | 0.33 | 0.34 | 0.34 | 0.31 | 0.28 | 0.34 | 0.34 |
|  | Amount of resin |  |  | 9.6 | 9.6 | 9.6 | 9.6 | 9.6 | 9.6 | 9.6 |
|  | Amount of water |  |  | 66.8 | 66.8 | 66.8 | 66.8 | 66.8 | 66.8 | 67.1 |
| Evaluation results | Discharge stability | Standby discharge properties |  | A | A | B | A | B | A | A |
|  |  | Continuous discharge properties |  | B+ | A | B+ | B+ | B+ | A | A |
|  | Printed image quality (beading, voids) |  |  | A | A | A | A | A | A | A |

|  |  |  |  |  | Ex. 8 | Ex. 9 | Ex. 10 | Ex. 11 | Ex. 12 | Ex. 13 |
|---|---|---|---|---|---|---|---|---|---|---|
| Aqueous inkjet ink set No. |  |  |  |  | 8 | 9 | 10 | 11 | 12 | 13 |
| Blend amount | Ion exchanged water |  |  |  | 29.15 | 28.65 | 33.9 | 9.9 | 40.4 | 28.48 |
|  | Water-soluble organic solvent | Diol having 2 to 5 carbon | EG | bp 198° C. | 15 | 15 | 15 | 15 | 5 | 5 |
|  |  |  | 1,2-PD | bp 188° C. |  |  |  |  |  |  |
|  |  |  | 1,2-BD | bp 191° C. |  |  |  |  |  |  |
|  |  |  | 1,3-BD | bp 207° C. |  |  |  |  |  |  |
|  |  |  | 1,5-PeD | bp 239° C. |  |  |  |  |  |  |
|  |  | Hexylene glycol |  | bp 196° C. | 5 | 5 | 0.5 | 24.5 | 1 | 1 |
|  |  | Others | 3-methyl-1,3-butylene glycol monomethyl ether | bp 173° C. |  |  |  |  |  |  |
|  |  |  | Diethylene glycol monoethyl ether | bp 202° C. |  |  |  |  |  |  |
|  |  |  | Diethylene glycol methyl ethyl ether | bp 179° C. |  |  |  |  | 3 | 15 |
|  |  |  | Glycerin | bp 290° C. |  |  |  |  |  |  |
|  |  |  | 2-pyrrolidone | bp 245° C. |  |  |  |  |  |  |
|  | Surfactant | Acetylene diol-based | Surfynol 485 | HLB: 17 |  |  |  |  |  |  |
|  |  |  | Surfynol 465 | HLB: 13 |  |  |  |  |  |  |
|  |  |  | Olfin E1006 | HLB: 11 |  |  |  |  |  |  |
|  |  |  | Olfin E1004 | HLB: 9 |  |  |  |  |  |  |
|  |  |  | Surfynol 2502 | HLB: 8 | 0.75 | 1.25 | 0.5 | 0.5 | 0.5 | 0.5 |
|  |  |  | Surfynol 440 | HLB: 8 |  |  |  |  |  |  |
|  |  |  | Surfynol420 | HLB: 4 |  |  |  |  |  |  |
|  |  |  | Surfynol 104 | HLB: 3 |  |  |  |  |  |  |
|  |  | Siloxane-based | TEGO Wet 280 |  |  |  |  |  |  |  |
|  |  |  | TEGO Twin 4100 |  |  |  |  |  |  |  |
|  | Resin |  | Resin A | Nv30% | 30 | 30 | 30 | 30 | 30 | 30 |
|  |  |  | Resin B | Nv40.5% |  |  |  |  |  |  |
|  | Pigment dispersion |  | Back pigment dispersion or cyan pigment dispersion |  | 20 | 20 | 20 | 20 | 20 | 20 |
|  | Other components (preservative) |  | ProxelGXL |  | 0.1 | 0.1 | 0.1 | 0.1 | 0.1 | 0.1 |
| Specs | Total amount |  |  |  | 100 | 100 | 100 | 100 | 100 | 100 |
|  | Amount of hexylene glycol relative to total amount of water-soluble organic solvent |  |  |  | 24.9% | 24.9% | 3.2% | 61.9% | 11.0% | 4.7% |

TABLE 2-continued

| | | | | | | | | | | |
|---|---|---|---|---|---|---|---|---|---|---|
| | | Ratio of amount of diol having 2 to 5 carbon atoms/ amount of hexylene glycol | | | 3.0 | 3.0 | 30 | 0.61 | 5.0 | 5.0 |
| | | Ratio(E2/E1) of hexylene glycol E2 to diol having 2 to 5 carbon atoms E1 | | | 0.34 | 0.34 | 0.034 | 1.66 | 0.20 | 0.20 |
| | | Amount of resin | | | 9.6 | 9.6 | 9.6 | 9.6 | 9.6 | 9.6 |
| | | Amount of water | | | 66.6 | 66.1 | 71.3 | 47.33 | 77.8 | 65.8 |
| Evaluation results | Discharge stability | Standby discharge properties | | | A | B | B | C+ | C+ | C+ |
| | | Continuous discharge properties | | | A | B+ | B+ | A | A | B+ |
| | Printed image quality (beading, voids) | | | | A | B | A | B | A | A |

| | | | | | Ex. 14 | Ex. 15 | Ex. 16 | Ex. 17 | Ex. 18 | Ex. 19 |
|---|---|---|---|---|---|---|---|---|---|---|
| Aqueous inkjet ink set No. | | | | | 14 | 15 | 16 | 17 | 18 | 19 |
| Blend amount | Ion exchanged water | | | | 31.4 | 31.4 | 31.4 | 31.4 | 31.4 | 29.4 |
| | Water-soluble organic solvent | Diol having 2 to 5 carbon | EG | bp 198° C. | | | | | | |
| | | | 1,2-PD | bp 188° C. | 16 | 16 | 16 | 16 | 16 | 15 |
| | | | 1,2-BD | bp 191° C. | | | | | | |
| | | | 1,3-BD | bp 207° C. | | | | | | |
| | | | 1,5-PeD | bp 239° C. | | | | | | |
| | | Hexylene glycol | | bp 196° C. | 2 | 2 | 2 | 2 | 2 | 3 |
| | | Others | 3-methyl-1,3-butylene glycol monomethyl ether | bp 173° C. | | | | | | |
| | | | Diethylene glycol monoethyl ether | bp 202° C. | | | | | | |
| | | | Diethylene glycol methyl ethyl ether | bp 179° C. | | | | | | 2 |
| | | | Glycerin | bp 290° C. | | | | | | |
| | | | 2-pyrrolidone | bp 245° C. | | | | | | |
| | Surfactant | Acetylene diol-based | Surfynol 485 | HLB: 17 | | | | | | |
| | | | Surfynol 465 | HLB: 13 | | | | | | |
| | | | Olfin E1006 | HLB: 11 | | | | | | |
| | | | Olfin E1004 | HLB: 9 | 0.5 | | | | | |
| | | | Surfynol 2502 | HLB: 8 | | 0.5 | | | | |
| | | | Surfynol 440 | HLB: 8 | | | 0.5 | | | 0.5 |
| | | | Surfynol420 | HLB: 4 | | | | 0.5 | | |
| | | | Surfynol 104 | HLB: 3 | | | | | 0.5 | |
| | | Siloxane-based | TEGO Wet 280 | | | | | | | |
| | | | TEGO Twin 4100 | | | | | | | |
| | Resin | | Resin A | Nv30% | 30 | 30 | 30 | 30 | 30 | 30 |
| | | | Resin B | Nv40.5% | | | | | | |
| | Pigment dispersion | | Back pigment dispersion or cyan pigment dispersion | | 20 | 20 | 20 | 20 | 20 | 20 |
| | Other components (preservative) | | ProxelGXL | | 0.1 | 0.1 | 0.1 | 0.1 | 0.1 | 0.1 |
| Specs | Total amount | | | | 100 | 100 | 100 | 100 | 100 | 100 |
| | Amount of hexylene glycol relative to total amount of water-soluble organic solvent | | | | 11.1% | 11.1% | 11.1% | 11.1% | 11.1% | 15.0% |
| | Ratio of amount of diol having 2 to 5 carbon atoms/ amount of hexylene glycol | | | | 8.0 | 8.0 | 8.0 | 8.0 | 8.0 | 5.0 |
| | Ratio(E2/E1) of hexylene glycol E2 to diol having 2 to 5 carbon atoms E1 | | | | 0.13 | 0.13 | 0.13 | 0.13 | 0.13 | 0.20 |
| | Amount of resin | | | | 9.6 | 9.6 | 9.6 | 9.6 | 9.6 | 9.6 |
| | Amount of water | | | | 68.8 | 68.8 | 68.8 | 68.8 | 68.8 | 66.8 |
| Evaluation results | Discharge stability | Standby discharge properties | | | A | A | A | A | B | B |
| | | Continuous discharge properties | | | B+ | B+ | B+ | B | B | A |
| | Printed image quality (beading, voids) | | | | A | A | A | A | B | A |

| | | | | | Ex. 20 | Ex. 21 | Ex. 22 | Ex. 23 | Ex. 24 | Ex. 25 | Ex. 26 |
|---|---|---|---|---|---|---|---|---|---|---|---|
| Aqueous inkjet ink set No. | | | | | 20 | 21 | 22 | 23 | 24 | 25 | 26 |
| Blend amount | Ion exchanged water | | | | 29.4 | 29.4 | 29.4 | 29.4 | 27.4 | 22.4 | 29.4 |
| | Water-soluble organic solvent | Diol having 2 to 5 carbon | EG | bp 198° C. | | | | | | | |
| | | | 1,2-PD | bp 188° C. | 6 | 6 | 5 | 4 | 2 | 2 | 5 |
| | | | 1,2-BD | bp 191° C. | | | | | | | |
| | | | 1,3-BD | bp 207° C. | | | | | | | |
| | | | 1,5-PeD | bp 239° C. | | | | | | | |
| | | Hexylene glycol | | bp 196° C. | 6 | 7.5 | 8 | 8 | 10 | 12.5 | 8 |
| | | Others | 3-methyl-1,3-butylene glycol monomethyl ether | bp 173° C. | | | | | | | 7 |
| | | | Diethylene glycol monoethyl ether | bp 202° C. | | | | | | | |
| | | | Diethylene glycol methyl ethyl ether | bp 179° C. | 8 | 11.5 | 7 | 8 | 10 | 12.5 | |
| | | | Glycerin | bp 290° C. | | | | | | | |
| | | | 2-pyrrolidone | bp 245° C. | | | | | | | |

TABLE 2-continued

|  |  |  |  |  |  |  |  |  |  |  |
|---|---|---|---|---|---|---|---|---|---|---|
|  | Surfactant | Acetylene diol-based | Surfynol 485 | HLB: 17 |  |  |  |  |  |  |
|  |  |  | Surfynol 465 | HLB: 13 |  |  |  |  |  |  |
|  |  |  | Olfin E1006 | HLB: 11 |  |  |  |  |  |  |
|  |  |  | Olfin E1004 | HLB: 9 |  |  |  |  |  |  |
|  |  |  | Surfynol 2502 | HLB: 8 |  |  |  |  |  |  |
|  |  |  | Surfynol 440 | HLB: 8 | 0.5 | 0.5 | 0.5 | 0.5 | 0.5 | 0.5 | 0.5 |
|  |  |  | Surfynol420 | HLB: 4 |  |  |  |  |  |  |
|  |  |  | Surfynol 104 | HLB: 3 |  |  |  |  |  |  |
|  |  | Siloxane-based | TEGO Wet 280 |  |  |  |  |  |  |  |
|  |  |  | TEGO Twin 4100 |  |  |  |  |  |  |  |
|  | Resin |  | Resin A | Nv30% | 30 | 30 | 30 | 30 | 30 | 30 | 30 |
|  |  |  | Resin B | Nv40.5% |  |  |  |  |  |  |
|  | Pigment dispersion |  | Back pigment dispersion or cyan pigment dispersion |  | 20 | 20 | 20 | 20 | 20 | 20 | 20 |
|  | Other components (preservative) |  | ProxelGXL |  | 0.1 | 0.1 | 0.1 | 0.1 | 0.1 | 0.1 | 0.1 |
| Specs | Total amount |  |  |  | 100 | 100 | 100 | 100 | 100 | 100 | 100 |
|  | Amount of hexylene glycol relative to total amount of water-soluble organic solvent |  |  |  | 29.9% | 29.9% | 39.9% | 39.9% | 45.3% | 46.2% | 39.9% |
|  | Ratio of amount of diol having 2 to 5 carbon atoms/amount of hexylene glycol |  |  |  | 1.0 | 0.80 | 0.63 | 0.60 | 0.20 | 0.16 | 0.63 |
|  | Ratio(E2/E1) of hexylene glycol E2 to diol having 2 to 5 carbon atoms E1 |  |  |  | 1.01 | 1.27 | 1.62 | 2.03 | 5.07 | 6.34 | 1.62 |
|  | Amount of resin |  |  |  | 9.6 | 9.6 | 9.6 | 9.6 | 9.6 | 9.6 | 9.6 |
|  | Amount of water |  |  |  | 66.8 | 66.8 | 66.8 | 66.8 | 64.8 | 59.8 | 66.8 |
| Evaluation results | Discharge stability | Standby discharge properties |  |  | A | A | B | C+ | C+ | C+ | A |
|  |  | Continuous discharge properties |  |  | A | A | A | B+ | B+ | B | A |
|  | Printed image quality (beading, voids) |  |  |  | A | B | B | B | B | B | A |

|  |  |  |  |  | Ex. 27 | Ex. 28 | Ex. 29 | Ex. 30 | Ex. 31 | Ex. 32 | Ex. 33 |
|---|---|---|---|---|---|---|---|---|---|---|---|
| Aqueous inkjet ink set No. |  |  |  |  | 27 | 28 | 29 | 30 | 31 | 32 | 33 |
| Blend amount | Ion exchanged water |  |  |  | 29.4 | 28.4 | 28.4 | 31.4 | 22.7 | 28.9 | 28.9 |
|  | Water-soluble organic solvent | Diol having 2 to 5 carbon | EG | bp 198° C. |  |  |  |  |  |  |  |
|  |  |  | 1,2-PD | bp 188° C. | 5 | 5 | 5 | 10 | 20 | 15 | 15 |
|  |  |  | 1,2-BD | bp 191° C. |  |  |  |  |  |  |  |
|  |  |  | 1,3-BD | bp 207° C. |  |  |  |  |  |  |  |
|  |  |  | 1,5-PeD | bp 239° C. |  |  |  |  |  |  |  |
|  |  | Hexylene glycol |  | bp 196° C. | 8 | 1 | 1 | 2 | 6.7 | 5 | 5 |
|  |  | Others | 3-methyl-1,3-butylene glycol monomethyl ether | bp 173° C. |  | 15 |  |  |  |  |  |
|  |  |  | Diethylene glycol monoethyl ether | bp 202° C. | 7 |  | 15 |  |  |  |  |
|  |  |  | Diethylene glycol methyl ethyl ether | bp 179° C. |  |  |  | 6 |  |  |  |
|  |  |  | Glycerin | bp 290° C. |  |  |  |  |  |  |  |
|  |  |  | 2-pyrrolidone | bp 245° C. |  |  |  |  |  |  |  |
|  | Surfactant | Acetylene diol-based | Surfynol 485 | HLB: 17 |  |  |  |  |  |  |  |
|  |  |  | Surfynol 465 | HLB: 13 |  |  |  |  |  |  |  |
|  |  |  | Olfin E1006 | HLB: 11 |  |  |  |  |  |  |  |
|  |  |  | Olfin E1004 | HLB: 9 |  |  |  |  |  |  |  |
|  |  |  | Surfynol 2502 | HLB: 8 |  | 0.5 | 0.5 | 0.5 | 0.5 | 0.5 | 0.5 |
|  |  |  | Surfynol 440 | HLB: 8 | 0.5 |  |  |  |  |  |  |
|  |  |  | Surfynol420 | HLB: 4 |  |  |  |  |  |  |  |
|  |  |  | Surfynol 104 | HLB: 3 |  |  |  |  |  |  |  |
|  |  | Siloxane-based | TEGO Wet 280 |  |  |  |  |  |  | 0.5 |  |
|  |  |  | TEGO Twin 4100 |  |  |  |  |  |  |  | 0.5 |
|  | Resin |  | Resin A | Nv30% | 30 | 30 | 30 | 30 | 30 | 30 | 30 |
|  |  |  | Resin B | Nv40.5% |  |  |  |  |  |  |  |
|  | Pigment dispersion |  | Back pigment dispersion or cyan pigment dispersion |  | 20 | 20 | 20 | 20 | 20 | 20 | 20 |
|  | Other components (preservative) |  | ProxelGXL |  | 0.1 | 0.1 | 0.1 | 0.1 | 0.1 | 0.1 | 0.1 |
| Specs | Total amount |  |  |  | 100 | 100 | 100 | 100 | 100 | 100 | 100 |
|  | Amount of hexylene glycol relative to total amount of water-soluble organic solvent |  |  |  | 39.9% | 4.7% | 4.7% | 11.1% | 25.0% | 24.9% | 24.9% |
|  | Ratio of amount of diol having 2 to 5 carbon atoms/amount of hexylene glycol |  |  |  | 0.6 | 5.0 | 5.0 | 5.0 | 3.0 | 3.0 | 3.0 |
|  | Ratio(E2/E1) of hexylene glycol E2 to diol having 2 to 5 carbon atoms E1 |  |  |  | 1.62 | 0.20 | 0.20 | 0.20 | 0.34 | 0.34 | 0.34 |
|  | Amount of resin |  |  |  | 9.6 | 9.6 | 9.6 | 9.6 | 9.6 | 9.6 | 9.6 |
|  | Amount of water |  |  |  | 66.8 | 65.8 | 65.8 | 68.8 | 60.1 | 66.3 | 66.3 |
| Evaluation results | Discharge stability | Standby discharge properties |  |  | A | B | B | A | A | A | A |
|  |  | Continuous discharge properties |  |  | A | A | A | A | A | A | A |
|  | Printed image quality (beading, voids) |  |  |  | A | A | A | A | A | A | A |

TABLE 2-continued

|  |  |  |  |  | Ex. 34 | Ex. 35 | Ex. 36 | Ex. 37 | Ex. 38 | Ex. 39 |
|---|---|---|---|---|---|---|---|---|---|---|
| Aqueous inkjet ink set No. |  |  |  |  | 34 | 35 | 36 | 37 | 38 | 39 |
| Blend amount | Ion exchanged water |  |  |  | 29.4 | 29.4 | 29.4 | 29.4 | 29.4 | 29.4 |
|  | Water-soluble organic solvent | Diol having 2 to 5 carbon | EG | bp 198° C. |  |  |  |  |  |  |
|  |  |  | 1,2-PD | bp 188° C. | 15 | 14 | 10 | 5 | 14 | 12 |
|  |  |  | 1,2-BD | bp 191° C. |  |  |  |  |  |  |
|  |  |  | 1,3-BD | bp 207° C. |  |  |  |  |  |  |
|  |  |  | 1,5-PeD | bp 239° C. |  |  |  |  |  |  |
|  |  | Hexylene glycol |  | bp 196° C. | 5 | 5 | 5 | 5 | 5 | 5 |
|  |  | Others | 3-methyl-1,3-butylene glycol monomethyl ether | bp 173° C. |  |  |  |  |  |  |
|  |  |  | Diethylene glycol monoethyl ether | bp 202° C. |  |  |  |  |  |  |
|  |  |  | Diethylene glycol methyl ethyl ether | bp 179° C. |  |  |  |  |  |  |
|  |  |  | Glycerin | bp 290° C. |  | 1 | 5 | 10 |  |  |
|  |  |  | 2-pyrrolidone | bp 245° C. |  |  |  |  | 1 | 3 |
|  | Surfactant | Acetylene diol-based | Surfynol 485 | HLB: 17 |  |  |  |  |  |  |
|  |  |  | Surfynol 465 | HLB: 13 |  |  |  |  |  |  |
|  |  |  | Olfin E1006 | HLB: 11 |  |  |  |  |  |  |
|  |  |  | Olfin E1004 | HLB: 9 |  |  |  |  |  |  |
|  |  |  | Surfynol 2502 | HLB: 8 |  | 0.5 | 0.5 | 0.5 | 0.5 | 0.5 |
|  |  |  | Surfynol 440 | HLB: 8 |  |  |  |  |  |  |
|  |  |  | Surfynol420 | HLB: 4 |  |  |  |  |  |  |
|  |  |  | Surfynol 104 | HLB: 3 | 0.5 |  |  |  |  |  |
|  |  | Siloxane-based | TEGO Wet 280 |  |  |  |  |  |  |  |
|  |  |  | TEGO Twin 4100 |  |  |  |  |  |  |  |
|  | Resin |  | Resin A | Nv30% | 30 | 30 | 30 | 30 | 30 | 30 |
|  |  |  | Resin B | Nv40.5% |  |  |  |  |  |  |
|  | Pigment dispersion |  | Back pigment dispersion or cyan pigment dispersion |  | 20 | 20 | 20 | 20 | 20 | 20 |
|  | Other components (preservative) |  | ProxelGXL |  | 0.1 | 0.1 | 0.1 | 0.1 | 0.1 | 0.1 |
|  | Total amount |  |  |  | 100 | 100 | 100 | 100 | 100 | 100 |
| Specs | Amount of hexylene glycol relative to total amount of water-soluble organic solvent |  |  |  | 24.9% | 26.2% | 33.2% | 49.7% | 26.2% | 29.3% |
|  | Ratio of amount of diol having 2 to 5 carbon atoms/amount of hexylene glycol |  |  |  | 3.0 | 2.8 | 2.0 | 1.0 | 2.8 | 2.4 |
|  | Ratio(E2/E1) of hexylene glycol E2 to diol having 2 to 5 carbon atoms E1 |  |  |  | 0.34 | 0.36 | 0.51 | 1.01 | 0.36 | 0.42 |
|  | Amount of resin |  |  |  | 9.6 | 9.6 | 9.6 | 9.6 | 9.6 | 9.6 |
|  | Amount of water |  |  |  | 66.8 | 66.8 | 66.8 | 66.8 | 66.8 | 66.8 |
| Evaluation results | Discharge stability | Standby discharge properties |  |  | A | A | B | C+ | A | B |
|  |  | Continuous discharge properties |  |  | B+ | A | B+ | B | A | B+ |
|  | Printed image quality (beading, voids) |  |  |  | A | A | B | C | A | B |

|  |  |  |  |  | Ex. 40 | Ex. 41 | Ex. 42 | Ex. 43 | Com. Ex. 1 | Com. Ex. 2 | Com. Ex. 3 |
|---|---|---|---|---|---|---|---|---|---|---|---|
| Aqueous inkjet ink set No. |  |  |  |  | 40 | 41 | 42 | 43 | 44 | 45 | 46 |
| Blend amount | Ion exchanged water |  |  |  | 55.4 | 49.4 | 44.4 | 24.4 | 29.4 | 29.4 | 29.4 |
|  | Water-soluble organic solvent | Diol having 2 to 5 carbon | EG | bp 198° C. |  |  |  |  |  |  |  |
|  |  |  | 1,2-PD | bp 188° C. | 15 | 15 | 15 | 15 |  |  |  |
|  |  |  | 1,2-BD | bp 191° C. |  |  |  |  |  |  |  |
|  |  |  | 1,3-BD | bp 207° C. |  |  |  |  |  |  |  |
|  |  |  | 1,5-PeD | bp 239° C. |  |  |  |  | 20 | 20 | 20 |
|  |  | Hexylene glycol |  | bp 196° C. | 5 | 5 | 5 | 5 |  |  |  |
|  |  | Others | 3-methyl-1,3-butylene glycol monomethyl ether | bp 173° C. |  |  |  |  |  |  |  |
|  |  |  | Diethylene glycol monoethyl ether | bp 202° C. |  |  |  |  |  |  |  |
|  |  |  | Diethylene glycol methyl ethyl ether | bp 179° C. |  |  |  |  |  |  |  |
|  |  |  | Glycerin | bp 290° C. |  |  |  |  |  |  |  |
|  |  |  | 2-pyrrolidone | bp 245° C. |  |  |  |  |  |  |  |
|  | Surfactant | Acetylene diol-based | Surfynol 485 | HLB: 17 |  |  |  |  | 0.5 |  |  |
|  |  |  | Surfynol 465 | HLB: 13 |  |  |  |  |  | 0.5 |  |
|  |  |  | Olfin E1006 | HLB: 11 |  |  |  |  |  |  |  |
|  |  |  | Olfin E1004 | HLB: 9 |  |  |  |  |  |  |  |
|  |  |  | Surfynol 2502 | HLB: 8 | 0.5 | 0.5 | 0.5 | 0.5 |  |  | 0.5 |
|  |  |  | Surfynol 440 | HLB: 8 |  |  |  |  |  |  |  |
|  |  |  | Surfynol420 | HLB: 4 |  |  |  |  |  |  |  |
|  |  |  | Surfynol 104 | HLB: 3 |  |  |  |  |  |  |  |
|  |  | Siloxane-based | TEGO Wet 280 |  |  |  |  |  |  |  |  |
|  |  |  | TEGO Twin 4100 |  |  |  |  |  |  |  |  |

TABLE 2-continued

| | | | | | | | | | | | |
|---|---|---|---|---|---|---|---|---|---|---|---|
| | Resin | Resin A | Nv30% | 4 | 10 | 15 | | 30 | 30 | 30 | |
| | | Resin B | Nv40.5% | | | | 35 | | | | |
| | Pigment dispersion | Back pigment dispersion or cyan pigment dispersion | | 20 | 20 | 20 | 20 | 20 | 20 | 20 | |
| | Other components (preservative) | ProxelGXL | | 0.1 | 0.1 | 0.1 | 0.1 | 0.1 | 0.1 | 0.1 | |
| Specs | Total amount | | | 100 | 100 | 100 | 100 | 100 | 100 | 100 | |
| | Amount of hexylene glycol relative to total amount of water-soluble organic solvent | | | 24.9% | 24.9% | 24.9% | 24.9% | 0% | 0% | 0% | |
| | Ratio of amount of diol having 2 to 5 carbon atoms/ amount of hexylene glycol | | | 3.0 | 3.0 | 3.0 | 3.0 | — | — | — | |
| | Ratio(E2/E1) of hexylene glycol E2 to diol having 2 to 5 carbon atoms E1 | | | 0.34 | 0.34 | 0.34 | 0.34 | 0 | 0 | 0 | |
| | Amount of resin | | | 1.8 | 3.6 | 5.1 | 14.8 | 9.6 | 9.6 | 9.6 | |
| | Amount of water | | | 74.6 | 72.8 | 71.3 | 40.8 | 66.8 | 66.8 | 66.8 | |
| Evaluation results | Discharge stability | Standby discharge properties | | A | A | A | A | D+ | D+ | D | |
| | | Continuous discharge properties | | A | A | A | A | D+ | D+ | D | |
| | Printed image quality (beading, voids) | | | C | B | A | A | D | D | D+ | |

| | | | | | Com. Ex. 4 | Com. Ex. 5 | Com. Ex. 6 | Com. Ex. 7 | Com. Ex. 8 | Com. Ex. 9 |
|---|---|---|---|---|---|---|---|---|---|---|
| | Aqueous inkjet ink set No. | | | | 47 | 48 | 49 | 50 | 51 | 52 |
| Blend amount | Ion exchanged water | | | | 28.9 | 28.9 | 29.4 | 29.4 | 31.4 | 31.4 |
| | Water-soluble organic solvent | Diol having 2 to 5 carbon | EG | bp 198° C. | | | | | | |
| | | | 1,2-PD | bp 188° C. | | | | | 16 | 16 |
| | | | 1,2-BD | bp 191° C. | | | | | | |
| | | | 1,3-BD | bp 207° C. | | | | | | |
| | | | 1,5-PeD | bp 239° C. | 20 | 20 | | | | |
| | | Hexylene glycol | | bp 196° C. | | | 20 | 20 | 2 | 2 |
| | | Others | 3-methyl-1,3-butylene glycol monomethyl ether | bp 173° C. | | | | | | |
| | | | Diethylene glycol monoethyl ether | bp 202° C. | | | | | | |
| | | | Diethylene glycol methyl ethyl ether | bp 179° C. | | | | | | |
| | | | Glycerin | bp 290° C. | | | | | | |
| | | | 2-pyrrolidone | bp 245° C. | | | | | | |
| | Surfactant | Acetylene diol-based | Surfynol 485 | HLB: 17 | 0.5 | 0.5 | 0.5 | | | |
| | | | Surfynol 465 | HLB: 13 | | | | | 0.5 | |
| | | | Olfin E1006 | HLB: 11 | | | | | | 0.5 |
| | | | Olfin E1004 | HLB: 9 | | | | | | |
| | | | Surfynol 2502 | HLB: 8 | 0.5 | | | 0.5 | | |
| | | | Surfynol 440 | HLB: 8 | | 0.5 | | | | |
| | | | Surfynol420 | HLB: 4 | | | | | | |
| | | | Surfynol 104 | HLB: 3 | | | | | | |
| | | Siloxane-based | TEGO Wet 280 | | | | | | | |
| | | | TEGO Twin 4100 | | | | | | | |
| | Resin | Resin A | Nv30% | | 30 | 30 | 30 | 30 | 30 | 30 |
| | | Resin B | Nv40.5% | | | | | | | |
| | Pigment dispersion | Back pigment dispersion or cyan pigment dispersion | | | 20 | 20 | 20 | 20 | 20 | 20 |
| | Other components (preservative) | ProxelGXL | | | 0.1 | 0.1 | 0.1 | 0.1 | 0.1 | 0.1 |
| Specs | Total amount | | | | 100 | 100 | 100 | 100 | 100 | 100 |
| | Amount of hexylene glycol relative to total amount of water-soluble organic solvent | | | | 0% | 0% | — | — | 11.1% | 11.1% |
| | Ratio of amount of diol having 2 to 5 carbon atoms/ amount of hexylene glycol | | | | — | — | 0 | 0 | 8.0 | 8.0 |
| | Ratio(E2/E1) of hexylene glycol E2 to diol having 2 to 5 carbon atoms E1 | | | | 0 | 0 | — | — | 0.13 | 0.13 |
| | Amount of resin | | | | 9.6 | 9.6 | 9.6 | 9.6 | 9.6 | 9.6 |
| | Amount of water | | | | 66.3 | 66.3 | 66.8 | 66.8 | 68.8 | 68.8 |
| Evaluation results | Discharge stability | Standby discharge properties | | | D | D | C | D+ | C+ | B |
| | | Continuous discharge properties | | | D | D | C | D+ | B | B |
| | Printed image quality (beading, voids) | | | | D | D | D | D+ | D | D |

Meanings of abbreviations and details of product names in Table 2 are as follows. In Table 2, "bp" represents a boiling point, and "Nv" represents a solid fraction concentration. VE1 represents energy required to evaporate a diol having 2 to 5 carbon atoms, VE2 represents energy required to evaporate a hexylene glycol, and (VE2)/(VE1) represents the ratio.

Diol Having 2 to 5 Carbon Atoms

EG: ethylene glycol (specific heat: 0.556 cal/g·° C., boiling point: 198° C.)

1,2-PD: 1,2-propanediol (specific heat: 0.574 cal/g·° C., boiling point: 188° C.)

1,2-BD: 1,2-butanediol (specific heat: 0.559 cal/g·° C., boiling point: 191° C.)

1,3-BD: 1,3-butanediol (specific heat: 0.559 cal/g·° C., boiling point: 207° C.)

1,5-PeD: 1,5-Pentanediol (specific heat: 0.526 cal/g·° C., boiling point: 239° C.)

Hexylene Glycol
Specific heat: 0.555 cal/g·° C., boiling point: 196° C.

Other Water-Soluble Organic Solvents
3-methyl-1,3-butylene glycol monomethyl ether (boiling point: 173° C., surface tension: 30 mN/m)
Diethylene glycol monoethyl ether: (boiling point: 202° C., surface tension: 32 mN/m)
Diethylene glycol methyl ethyl ether: (boiling point: 179° C., surface tension: 24 mN/m)
Glycerin: (boiling point: 290° C., surface tension: 62 mN/m)
2-pyrrolidone: (boiling point: 245° C., surface tension: 45 mN/m)

Acetylenediol-Based Surfactants
Surfynol 485: acetylenediol manufactured by Evonik Japan Co., Ltd., HLB value: 17
Surfynol 465: acetylenediol manufactured by Evonik Japan Co., Ltd., HLB value: 13
Olfin E1006: acetylenediol manufactured by Nissin Chemical Industry Co., Ltd., HLB value: 11
Olfin E1004: acetylenediol manufactured by Nissin Chemical Industry Co., Ltd., HLB value: 9
Surfynol 2502: acetylenediol manufactured by Evonik Japan Co., Ltd., HLB value: 8
Surfynol 440: acetylenediol manufactured by Evonik Japan Co., Ltd., HLB value: 8
Surfynol 420: acetylenediol manufactured by Evonik Japan Co., Ltd., HLB value: 4
Surfynol 104: acetylenediol manufactured by Evonik Japan Co., Ltd., HLB value: 3

Siloxane-Based Surfactants
TEGO Wet 280: siloxane-based surfactant manufactured by Evonik Japan Co., Ltd.
TEGO Twin 4100: siloxane-based surfactant manufactured by Evonik Japan Co., Ltd.

Other Components
Proxel GXL: 1,2-benzoisothiazole-3-one dipropylene glycol aqueous solution (1,2-benzoisothiazole-3-one: dipropylene glycol:water=2:6:2, preservative manufactured by Arch Chemicals, Inc.)

Resins
Resin A (for use as a binder): resin produced by replicating the production example of binder resin 24 of JP 2020-180178A (used in the form of a resin solution having a solid fraction concentration of 30%). Note that resin A obtained had an acid value of 29.5 mgKOH/g, a hydroxyl value of 21.5 mgKOH/g, and a mass average molecular weight of 17,500.
Resin B (for use as a binder): QE-1042 (acrylic resin microparticles, solid fraction concentration: 40.5%, acid value: 33 mgKOH/g) manufactured by Seiko PMC Corporation.

Examples 1 to 43, Comparative Examples 1 to 9

Using sets of aqueous inkjet inks produced by the above-described method, the following evaluations were performed. The evaluation results are shown in Table 2.

Evaluation 1: Evaluation of Discharge Stability (Standby Discharge Properties)

An inkjet discharge apparatus equipped with an inkjet head "KJ4B-1200" (design resolution 1,200 dpi, nozzle diameter 20 μm) manufactured by KYOCERA Corporation was filled with an aqueous black ink or an aqueous cyan ink making up the above set of aqueous inkjet inks. After filling, the aqueous black ink or the aqueous cyan ink was pressurized until the aqueous black ink or the aqueous cyan ink bled from a nozzle of an inkjet head, and after wiping a nozzle plate, a nozzle check pattern was immediately printed under the condition of a frequency of 40 kHz. For the above nozzle check pattern having no nozzle failures, a solid image having a printing width of 10 cm and a length of 30 cm (100% coverage rate) was immediately printed. Note that OK top-coated paper was used as a printing substrate, and the printing conditions were set to a frequency of 40 kHz, a conveyor driving speed of 50 m/min, and a resolution of 1,200×1,200 dpi. After printing, the inkjet discharge apparatus was made to stand by for 1 hour in an environment of 25° C., and a solid image was then printed again using the printing substrate material and the same printing conditions as described above. At this time, the standby discharge properties were evaluated by visually confirming whether the beginning part of printing a solid printed matter was printed.

The evaluation criteria were as follows, and an evaluation of "C+" or higher was considered to be practically usable. Note that the above evaluation was performed each for the aqueous black ink and the aqueous cyan ink, which make up the set of aqueous inkjet inks. Table 2 shows results of an aqueous black ink and an aqueous cyan ink having poor evaluation.

Evaluation Criteria
A: nozzle failures were not confirmed in the nozzle check pattern, and no lacking was observed at the beginning part of printing in a solid printed matter printed immediately after printing the nozzle check pattern, and a solid printed matter printed after waiting for one hour.
B: nozzle failures were not confirmed in the nozzle check pattern, no lacking was observed at the beginning part of printing in a solid printed matter printed immediately after printing the nozzle check pattern, but lacking which is less than 3 cm was observed at the beginning part of printing in a solid printed matter printed after waiting for one hour.
C+: nozzle failures were not confirmed in the nozzle check pattern, no lacking was observed at the beginning part of printing in a solid printed matter printed immediately after printing the nozzle check pattern, but lacking which is 3 cm or more and less than 5 cm was observed at the beginning part of printing in a solid printed matter printed after waiting for one hour.
C: nozzle failures were not confirmed in the nozzle check pattern, and no lacking was observed at the beginning of printing in a solid printed matter printed immediately after printing the nozzle check pattern, but lacking which is 5 cm or more was observed at the beginning of printing in a solid printed matter printed after waiting for one hour.
D+: nozzle failures were not confirmed in the nozzle check pattern, but lacking was observed at the beginning of printing in a solid printed matter printed immediately after printing the nozzle check pattern.
D: One or more nozzle failures were confirmed in the nozzle check pattern.

Evaluation 2: Evaluation of Discharge Stability (Continuous Discharge Properties)

An inkjet discharge apparatus having the same configuration as in evaluation 1 was filled with the aqueous black ink or the aqueous cyan ink making up the above set of aqueous inkjet inks. After the filling, the aqueous black ink or the aqueous cyan ink was pressurized until the aqueous black ink or the aqueous cyan ink bled from a nozzle of an inkjet head, and after wiping a nozzle plate, a nozzle check pattern was immediately printed under the condition of a frequency of 40 kHz. For the above nozzle check pattern having no nozzle failures, 10 solid images having a printing width of 10 cm×a length of 30 cm (100% coverage rate) were printed continuously. Note that OK top-coated paper was used as a printing substrate, and the printing conditions were set to a frequency of 40 kHz, a conveyor driving speed of 50 m/min, and a resolution of 1,200×1,200 dpi. The continuous discharge properties were evaluated by visually confirming whether each of the 10 solid printed matter was printed without lacking.

The evaluation criteria were as follows, and an evaluation of "B" or higher was considered to be practically usable. Note that the above evaluation was performed for the aqueous black ink and for the aqueous cyan ink making up the set of aqueous inkjet inks. Table 2 shows results of an aqueous black ink and an aqueous cyan ink having poor evaluation.

Evaluation Criteria
- A: nozzle failures were not confirmed in a nozzle check pattern, and no lacking was observed in all 10 sheets of solid printed matter.
- B+: nozzle failures were not confirmed in a nozzle check pattern, but failures occurred in sheet 10 of solid printed matter printed immediately after printing the nozzle check pattern.
- B: nozzle failures were not confirmed in a nozzle check pattern, but failures occurred in sheet 9 of solid printed matter printed immediately after printing the nozzle check pattern.
- C: nozzle failures were not confirmed in a nozzle check pattern, but failures occurred in sheets 4 to 8 of solid printed matter printed immediately after printing the nozzle check pattern.
- D+: nozzle failures were not confirmed in a nozzle check pattern, but failures occurred in sheets 1 to 3 of solid printed matter printed immediately after printing the nozzle check pattern.
- D: one or more nozzle failures were confirmed in a nozzle check pattern.

Production of Black/Cyan Gradient Printed Matter

An inkjet discharge apparatus was prepared where two inkjet heads "KJ 4B-1200" (design resolution 1,200 dpi, nozzle diameter 20 μm) manufactured by KYOCERA Corporation were installed side by side along the transport direction of substrates, and a set of aqueous inkjet inks was filled in the order of the aqueous black ink and the aqueous cyan ink from the upstream side in the transport direction. On the conveyor, an A4 size (width 21 cm× length 30 cm) OPP film ("OPU-1", a biaxially-oriented polypropylene film manufactured by Mitsui Chemicals Tohcello, Inc., thickness 20 μm) was fixed as a printing substrate.

Then, the conveyor was driven at 50 m/min, and when the printing substrate passed under the installation part of the inkjet heads, the above set of aqueous inkjet inks were each discharged under the condition of a drop volume of 2.6 pL to print a black/cyan gradient image. More specifically, an image was obtained where a black color gradient image (width 5 cm×length 30 cm) that was printed using the aqueous black ink, while a coverage rate was changed at 10% intervals from 10% to 100%, and a cyan color gradient image (width 5 cm× length 30 cm) that was printed using the aqueous cyan ink, while a coverage rate was changed at 10% intervals from 10% to 100%, were arranged next to each other. Immediately, the printing substrate after printing was put into a blast constant temperature incubator set at 70° C., and dried for 3 minutes, thereby producing a black/cyan gradient printed matter.

Evaluation 3: Evaluation of Printed Image Quality (Beading, Voids)

Black/cyan gradient printed matter produced by the above-described method was visually observed. The printed image quality of black/cyan gradient printed matter was evaluated by checking the coverage rate of a part where density irregularities (beading) began to be observed, and by further checking the presence or absence of voids at a coverage rate of 100% for printed matter where the density irregularities were not observed at a coverage rate of 80%.

The evaluation criteria were as follows, and an evaluation of "C" or higher was considered to be practically usable. Note that Table 2 shows results of the poorest evaluation among inks making up each aqueous inkjet ink set.

Evaluation Criteria
- A: no density irregularities were observed at a coverage rate of 80%, and no voids were observed at a coverage rate of 100%.
- B: no density irregularities were observed at a coverage rate of 80%, but voids were observed at a coverage rate of 100%.
- C: no density irregularities were observed at a coverage rate of 70%, but density irregularities were observed at a coverage rate of 80%.
- D+: no density irregularities were observed at a coverage rate of 60%, but density irregularities were observed at a coverage rate of 70%.
- D: density irregularities were observed at a coverage rate of 60%.

As shown in Table 2 above, aqueous inkjet inks of examples 1 to 43 having configurations of the present embodiment have excellent discharge stability and excellent printed images without any beading and voids, as compared with aqueous inkjet inks of comparative examples 1 to 9. Consequently, it was found that aqueous inkjet inks having configurations of the present embodiment were excellent in having both favorable printed image quality and favorable discharge stability of printed matter.

The invention claimed is:

1. An aqueous inkjet ink, comprising:
   a colorant; a water-soluble organic solvent; a surfactant; and water, wherein
   the water-soluble organic solvent includes a diol having 2 to 5 carbon atoms, and a hexylene glycol, and
   the surfactant includes an acetylenediol having an HLB value of 10 or less.

2. The aqueous inkjet ink according to claim 1, wherein an amount of the hexylene glycol is within a range from 0.1% to 30% by mass relative to a total amount of the aqueous inkjet ink.

3. The aqueous inkjet ink according to claim 1, wherein an amount of the acetylenediol having the HLB value of 10 or less is within a range from 0.1% to 2.0% by mass relative to a total amount of the aqueous inkjet ink.

4. A printed matter obtained by printing using the aqueous inkjet ink according to claim 1.

5. The aqueous inkjet ink according to claim 2, wherein an amount of the acetylenediol having the HLB value of 10 or less is within a range from 0.1% to 2.0% by mass relative to a total amount of the aqueous inkjet ink.

6. A printed matter obtained by printing using the aqueous inkjet ink according to claim 2.

* * * * *